United States Patent
Nath et al.

(10) Patent No.: US 9,462,060 B2
(45) Date of Patent: Oct. 4, 2016

(54) SYSTEM AND METHOD FOR SENDING NOTIFICATION MESSAGE TO A MOBILE STATION USING SESSION INITIATION PROTOCOL (SIP)

(75) Inventors: Badri Nath, Edison, NJ (US); Rakesh Kushwaha, Marlboro, NJ (US); Aman Bhasin, Old Bridge, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 410 days.

(21) Appl. No.: 11/786,000

(22) Filed: Apr. 23, 2007

(65) Prior Publication Data

US 2008/0261631 A1    Oct. 23, 2008

(51) Int. Cl.
*H04L 29/08* (2006.01)
*H04L 29/06* (2006.01)

(52) U.S. Cl.
CPC ......... *H04L 67/125* (2013.01); *H04L 65/1006* (2013.01)

(58) Field of Classification Search
CPC .................. H04L 67/125; H04L 65/1006
USPC .............. 455/466, 435.1; 709/217, 218, 219, 709/220, 221, 222
See application file for complete search history.

(56) References Cited

U.S. PATENT DOCUMENTS

| | | | |
|---|---|---|---|
| 5,978,367 A * | 11/1999 | Kinnunen | H04B 7/2681 370/337 |
| 6,128,644 A * | 10/2000 | Nozaki | G06F 9/505 709/201 |
| 6,144,849 A | 11/2000 | Nodoushani | |
| 6,381,454 B1 | 4/2002 | Tiedemann | |
| 6,438,114 B1 | 8/2002 | Womack et al. | |
| 6,466,779 B1 | 10/2002 | Moles | |

(Continued)

FOREIGN PATENT DOCUMENTS

| | | |
|---|---|---|
| EP | 1662829 A1 | 5/2006 |
| JP | 11-308273 | 5/1999 |

(Continued)

OTHER PUBLICATIONS

Notification of Transmittal of International Search Report and the Written Opinion of the International Searching Authority dated Jun. 27, 2008 for PCT Application No. PCT/US200861305.

(Continued)

*Primary Examiner* — Olumide T Ajibade Akonai
*Assistant Examiner* — Martin Chang
(74) *Attorney, Agent, or Firm* — Brosmer, Kolefas & Associates, LLC (57) ABSTRACT

The present invention is a method and system for sending SIP notification messages to a wireless device, for example a wireless telephone, that can accept SIP control messages. A method is described for establishing a data session between a wireless device and a management server over a wireless network, the wireless device operable to receive and parse SIP messages, the wireless network operable to transmit messages between the wireless device and the management server. The method includes retrieving an address for the wireless device on the management server, sending a SIP invite message from the management server to the wireless device, receiving the SIP invite message on the wireless device, parsing the SIP invite message on the wireless device, and establishing the data session between the wireless device and the management server.

23 Claims, 6 Drawing Sheets

(56) References Cited

U.S. PATENT DOCUMENTS

| | | | |
|---|---|---|---|
| 6,529,729 B1 | 3/2003 | Nodoushani | |
| 6,549,770 B1 | 4/2003 | Marran | |
| 6,577,614 B1 | 6/2003 | Cook | |
| 6,622,017 B1 | 9/2003 | Hoffman | |
| 6,625,451 B1 | 9/2003 | La Medica, Jr. | |
| 6,725,056 B1 | 4/2004 | Moles | |
| 6,732,105 B1* | 5/2004 | Watson, Jr. | G06F 21/31 |
| 6,813,264 B2 | 11/2004 | Vassilovski | |
| 6,845,092 B2 | 1/2005 | Vassilovski et al. | |
| 6,980,556 B2 | 12/2005 | Vimpari | |
| 7,020,440 B2 | 3/2006 | Watanabe et al. | |
| 7,085,253 B2 | 8/2006 | Yang | |
| 7,305,090 B1 | 12/2007 | Hayes | |
| 2002/0037723 A1* | 3/2002 | Roach | H04L 67/30 455/435.1 |
| 2002/0073203 A1* | 6/2002 | Gilleland | 709/227 |
| 2003/0014488 A1* | 1/2003 | Dalal et al. | 709/204 |
| 2003/0101246 A1* | 5/2003 | Lahti | 709/221 |
| 2003/0153339 A1* | 8/2003 | Crockett | H04M 3/56 455/518 |
| 2003/0166398 A1 | 9/2003 | Netanel | |
| 2004/0024879 A1* | 2/2004 | Dingman et al. | 709/227 |
| 2004/0032843 A1* | 2/2004 | Schaefer et al. | 370/338 |
| 2004/0242209 A1 | 12/2004 | Kruis et al. | |
| 2005/0055687 A1* | 3/2005 | Mayer | 717/173 |
| 2005/0181793 A1 | 8/2005 | Netanel | |
| 2005/0254510 A1* | 11/2005 | Oja et al. | 370/431 |
| 2006/0023651 A1 | 2/2006 | Tsuchiuchi et al. | |
| 2006/0165060 A1* | 7/2006 | Dua | G06Q 20/20 370/352 |
| 2006/0174117 A1* | 8/2006 | Laitinen | H04L 9/0844 713/169 |
| 2006/0190575 A1 | 8/2006 | Harvey | |
| 2007/0136795 A1 | 6/2007 | Youn | |
| 2009/0024848 A1 | 1/2009 | Takasugi | |

FOREIGN PATENT DOCUMENTS

| | | |
|---|---|---|
| JP | 2004518356 | 6/2004 |
| JP | 200642087 | 2/2006 |
| JP | 2006-333034 A | 7/2006 |
| JP | 2006-333277 A | 7/2006 |
| JP | 2007-049645 A | 2/2007 |
| WO | 02058361 A2 | 7/2002 |
| WO | 2005109947 A1 | 11/2005 |

OTHER PUBLICATIONS

Notification of Reason for Rejection Japanese Office Action dated Apr. 23, 2012 received in corresponding Application No. 2009-528271.

Delaney, Brian William; "Reduced Energy Consumption and Improved Accuracy for Distributed Speech Recognition in Wireless Environments" Ph.D. Thesis, Georgia Tech Electrical and Computer Engineering Dept. Published Sep. 2004, www.gtel.gatech.edu/bitstreamll23456789.

Official Communication dated Apr. 8, 2008 which accompanies an International Search Report and a Written Opinion of the International Searching Authority, in PCT/US 07119818.

Non-Final Office Action dated Feb. 1, 2010, received in U.S. Appl. No. 11/798,243.

Final Office Action dated Jul. 19, 2010, received in U.S. Appl. No. 11/798,243.

Supplementary European Search Report dated Feb. 7, 2012 received in Application No. 07838093.8-2413/2060106.

Extended European Search Report dated Jan. 19, 2012 received in Application No. 07838093.8-2413/2060106.

JPO, Office Action in JP Patent Application No. 2010-506457, mailed Dec. 17, 2012.

* cited by examiner

SYSTEM AND METHOD FOR SENDING NOTIFICATION MESSAGE TO A MOBILE STATION USING SESSION INITIATION PROTOCOL (SIP)

FIELD OF THE INVENTION

The present invention relates to a system and method using Session Initiation Protocol (SIP) control messages to send notification messages from a management server to wireless devices so that they can connect back to the management server. The SIP based messages are sent between the management server and the wireless device using a packet-switched network, such as an IP-based network, or between the management server and a proxy device with which the wireless device is registered.

BACKGROUND OF THE INVENTION

Remote wireless device management refers to implementations and proposals for managing wireless devices remotely by sending commands from a management system to the devices. Typically, the device is sent a notification message using SMS (Short Message Service) with the telephone number of the device as the destination. On receipt of the notification the device connects to the management server. Historically, SMS has been the bearer of choice for such notifications because it can be sent to any wireless device when only the telephone number of the device is known. Further, SMS is an always-on interface, in that as long as the device is registered with the wireless network, SMS messages can be delivered to the device. However, with the development of wireless devices which support wireless interfaces other than SMS, including Internet Protocol (IP), there is a need to push notifications using packet-switched networks.

Packet-switched networks, including the internet, may use IP for transporting packets between hosts in a network. Voice as well as data may be sent over a packet-switched network. Voice over IP (VOIP) architecture provides a protocol called session initiation protocol (SIP) that handles signaling for call management functions. Examples of functions provided by SIP include INVITE, ACK, REGISTER, BYE, CANCEL etc. These functions can be interpreted by VOIP network elements to provide call management functions. For example, a SIP INVITE message indicates that a user or service is being invited to participate in a call session. Any network that supports VOIP should be configured to allow SIP messages to be routed to a host or device destination.

Wireless devices are increasingly being deployed that carry voice traffic supported by VOIP and SIP. Some converged devices support two distinct wireless interfaces; one using the traditional mobile wireless communications protocols and networks (for example, CDMA, GPRS, GSM and other conventional wide-area wireless networks and protocols) and another using interfaces that directly support the packet-switched IP protocol, such as IMS (IP multimedia subsystems), Wi-Fi, and WiMax. Wireless devices and networks that support SIP offer several advantages, including lower cost, over traditional wireless radio technologies.

These advantages drive a need to support SIP protocols on wireless devices in order to support functions previously implemented manually or over conventional networks, such as sending different types of notifications to wireless devices. One important function, using SIP messages to notify wireless devices to initiate management sessions with a server, has the advantage of providing an alternative to SMS. This capability would be useful where sending a message to devices through a packet-switched network is the preferred method of initiating management sessions with devices, for example for converged devices or where SMS is not available due to lack of coverage.

SUMMARY OF THE INVENTION

The present invention is a method and system for sending SIP notification messages to a wireless device, for example a wireless telephone, that can accept SIP control messages. The method and system of the present invention use SIP messages as notifications to host or device end-points in order to initiate remote management sessions with a server.

In one aspect of the present invention, a management server notifies the device client to establish a connection with the server, and provisions, activates, and/or manages the wireless device by programming the device with parameters and software. In order to connect to the management server, the device needs information about how to contact the server. A device that is pre-provisioned with the necessary information to connect to a management server on receipt of a notification message is called a "bootstrapped device". Bootstrap information—such as the address of the management server, the necessary credentials to communicate with the server, etc.—is sufficient for the device to establish a management session. During the resulting management session, the required parameters and software required for management of device on the network are sent to the device.

A SIP invite message is sent by a management server to notify a wireless device to initiate a management session. The management server can send the SIP message over a packet-switched network.

The present invention includes a system comprising a mobile wireless network connected with VOIP-enabled wireless devices. In the VOIP protocol, an SIP invite message can be used to establish a call session as well as establish a data session. In one embodiment of the present invention SIP invite is used to notify a wireless device to initiate a data session with a management server.

In one aspect of the invention, a method is described by which a management server sends notifications to a device using a SIP invite message. The method comprises receiving the telephone number of the device and embedding the credential information in the invite message. The credential information includes the address of the management server and the security credentials necessary to access the management server.

In another aspect of the invention, the management server determines the IP address of the device given the device's telephone number and then sends a notification message embedded in a SIP invite message over the network. In another aspect of the invention, the device informs the management server of its link local address (the device's own IP address derived from its MAC address).

In another aspect of the invention, a wireless device uses SIP messages to register with a proxy device which in turn registers the device with a management server. The registration information sent by the wireless device includes the capability of the wireless device. The management server will send a SIP invite message to the device to initiate a management session.

In another aspect of the invention, a wireless device uses SIP messages to register with a proxy device which in turn registers the device with a management server. The registration information sent by the wireless device will include a tag classifying the wireless device as direct or indirect. The management server structures the header of a SIP invite notification message based on the tag of the wireless device. If the tag indicates a direct device, the SIP invite message is sent from the management server directly to the wireless device. If the tag indicates an indirect device, the SIP invite message is sent to the proxy device which in turn relays the notification message to the wireless device. When a notification message is sent through the proxy device, the header information needed for the wireless device will be embedded inside the header information for the proxy device. The notification message will be contained in the message portion of the SIP invite message.

Yet another aspect of the invention is directed at a method by which the wireless device or the proxy device informs the management server of any change in the IP addresses of the wireless device due to a move into a new network or reassignment of the IP address.

The present invention teaches a method for establishing a data session between a wireless device and a management server over a wireless network, the wireless device operable to receive and parse SIP messages, the wireless network operable to transmit messages between the wireless device and the management server. The method includes retrieving an address for the wireless device on the management server, sending a SIP invite message from the management server to the wireless device, receiving the SIP invite message on the wireless device, parsing the SIP invite message on the wireless device, and establishing the data session between the wireless device and the management server.

In another aspect of the invention, the SIP invite message contains bootstrap information for the wireless device to connect to the management server.

In another aspect of the invention, the bootstrap information contained in the SIP invite message includes server security credentials and a server address to which to connect to the management server.

In another aspect of the invention, there is an additional step of receiving notification messages sent by the management server as SIP invite messages on a specific port on the wireless device.

In another aspect of the invention, there is an additional step of registering a device identity and network address of the wireless device with the management server.

In another aspect of the invention, there is an additional step of determining the network address of the wireless device from a device identity.

In another aspect of the invention, the step of determining the network address of the wireless device includes sending the device identity from the management server to a database using a SIP message and sending the network address of the device to the management server from the database using a SIP message.

In another aspect of the invention, there is an additional step of re-registering the wireless device with the management server when a network address of the wireless device changes.

A method is described for establishing a data session between a wireless device, a proxy device and a management server over a wireless network, the wireless device and the proxy device operable to receive and parse SIP messages, the wireless network operable to transmit messages between the wireless device and the proxy device and the proxy device and the management server. The method includes registering the wireless device with the proxy device, sending a notification message embedded inside a SIP invite message from the management server to the proxy device, sending the SIP invite message from the proxy device to the wireless device, receiving the SIP invite message on the wireless device, and parsing the SIP invite message on the wireless device.

In another aspect of the invention, a device identity of the wireless device is encapsulated within the SIP message sent to the proxy device. In another aspect of the invention, the notification message embedded in the SIP invite message contains bootstrap information for the device to connect to the management server. In another aspect of the invention the bootstrap information contained in the SIP invite message includes server credentials and a server address to which to connect to the management server.

In another aspect of the invention, there is an additional step of receiving the notification messages sent as SIP invite messages on a specific SIP port on the wireless device. In another aspect of the invention, there is an additional step of registering a network address of the proxy device with the management server. In another aspect of the invention, there is an additional step of registering a device identity and network address of the wireless device with the proxy device.

In another aspect of the invention, the proxy device registers a network address of the wireless device with the management server.

In another aspect of the invention, a link local address of the wireless device is encapsulated within the SIP message sent to the proxy device. In another aspect of the invention, the proxy device is listening on a special port for notification messages sent as SIP invite messages. In another aspect of the invention, the proxy registers its network address with the management server.

In another aspect of the invention, the wireless device registers its device identity and link local address with the proxy device. In another aspect of the invention, the proxy registers the link local address of the wireless device with the management server.

In another aspect of the invention, there is an additional step of re-registering the proxy device with the management server when a network address of the proxy device changes. In another aspect of the invention, there are additional steps, including detecting a change of a network address of the wireless device, re-registering the wireless device with the proxy device, and sending the re-registration of the wireless device to the management server from the proxy device.

In another aspect of the invention, the proxy device, on a change in a network address of the registered wireless device, re-registers the network address of the wireless device with the management server.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
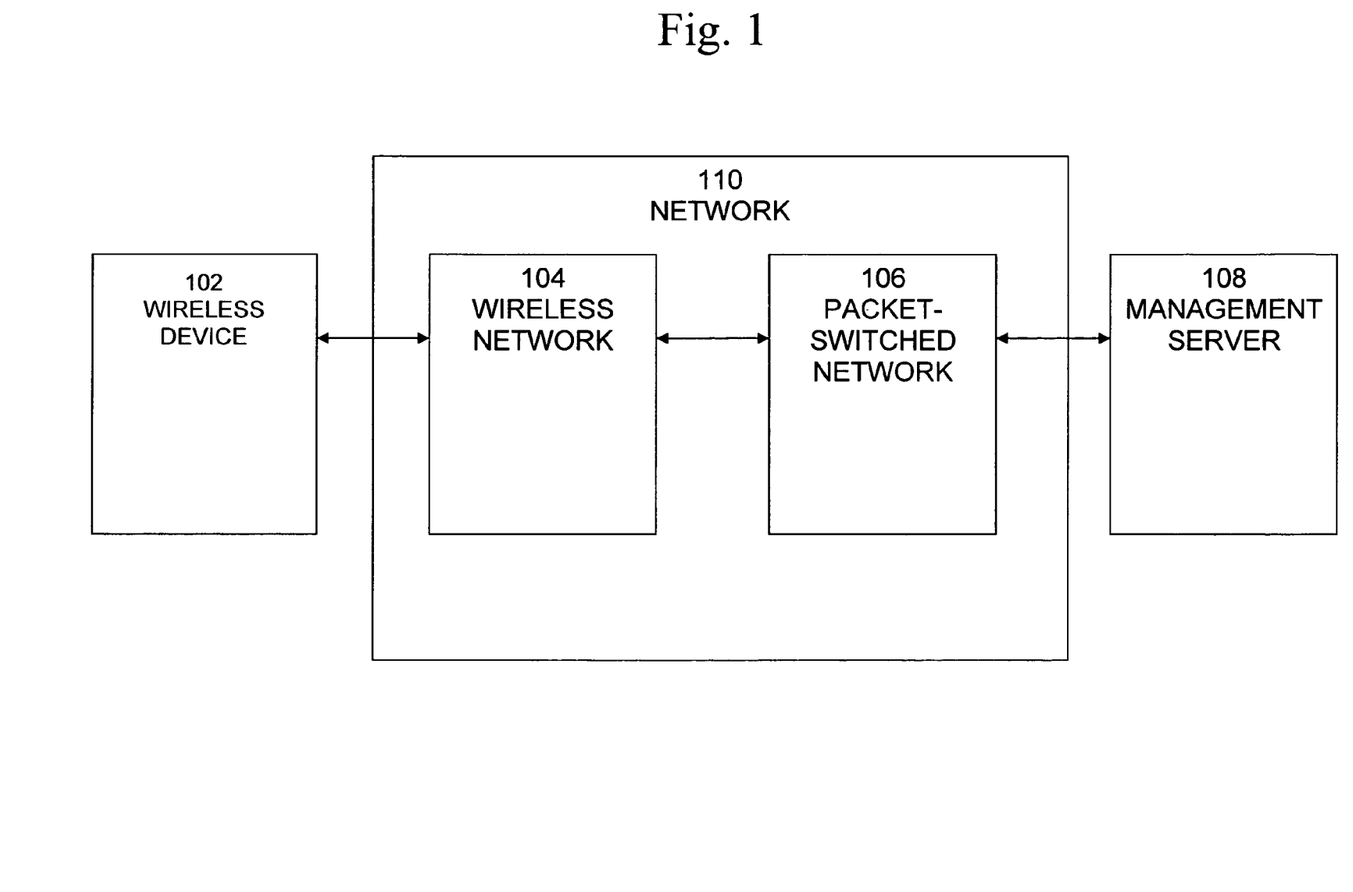
FIG. 1 is an exemplary block diagram of a network system in which the present invention may be implemented.

An exemplary block diagram of a network system in which the present invention may be implemented is shown in FIG. 1. The system in FIG. 1 is configured to remotely manage one or more wireless devices 102. A management server 108 is connected to a packet-switched network 106 which in turn is connected to a wireless network 104. The wireless device 102, either when notified by the management server 108 or periodically, communicatively connects to the management server 108 to initiate a management session, also called a data session, during which management actions are performed on the device 102. Management actions performed during a data session or management session may include, but are not limited to, programming the device 102 with parameters and software for provisioning, activating, or updating of the device 102. Wireless network 104 is connected to a device 102, for example by a wireless interface. Wireless network 104 may use communication protocols or other wireless link protocols, including but not limited to CDMA, GPRS, UMTS, HSPDA, EVDO, EVDV, WiFi, WiMAX, or Bluetooth.

A mobile wireless device 102 can be any device that supports wireless communication including mobile telephones, laptop computers, personal digital assistants (PDAs), or network-capable-televisions. The device 102 could support a single wireless communication standard or support multiple wireless communication standards. These communication standards are exemplified by wireless networks such as GSM, CDMA, FOMA, next generation technologies found in cellular communication systems, as well as packet-switched IP-based wireless networks exemplified by Bluetooth, 802.11 or WiMax networks. A device 102 supporting multiple standards may communicate on any of the standards either separately or simultaneously. The communication could occur in different mediums, for example, over licensed spectrum or unlicensed spectrum or in another example, over local area networks or wide area networks. The wireless device 102 will support SIP, and may support other protocols, for example SIP-based VOIP.

The wireless device 102 will also support data transmission over packet-switched networks 110. The device 102 can be connected to network 110 in a variety of ways, for example device 102 may be connected directly to a line-based network 106, or in another example to a wireless network 104, or for example simply treat the networks as transparent 110 (any combination of a wireless or line-based network, including solely one or the other). Network 110 may include one or more networks, for example may include both public networks and private networks, and may utilize any packet-based networking protocol such as Transmission Control Protocol/Internet Protocol (TCP/IP).

Figure 2:
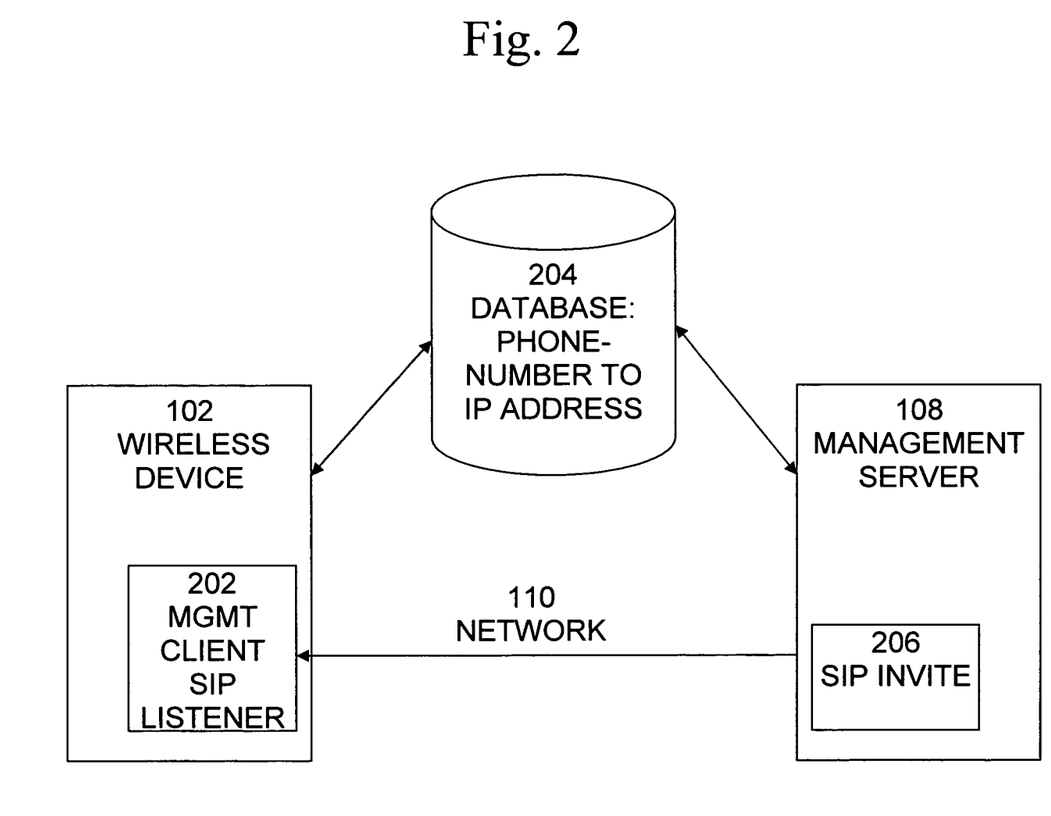
FIG. 2 is an exemplary block diagram of the network system shown in FIG. 1 incorporating the messaging technique of the present invention.

As shown on FIG. 2, a management client 202 on the wireless device 102 is capable of handling messages received over a network 110. The network 110 supports sending of messages using SMS (short messaging service) or using SIP. The management client 202 is capable of receiving and parsing SIP messages. The management client 202 for example may be software programmed on the memory of device 102, or as another example, may be programmed on a chip integrated into the hardware of a device 102, or in yet another example may be added as a portion of hardware peripheral and connected to device 102. Management client 202 may have a number of functions, for example, listening for, sending, or receiving SIP messages over the network 110. Management client 202 may communicatively connect with any system or device on network 110, for example including database 204 or management server 108. Any firewalls or gateways in the network 110 will be configured to allow SIP messages to pass through.

The management server 108 is connected to the packet-switched network 110 as shown in FIG. 2. To send a message to any host on the network 110, such as the wireless device 102, the management server 108 may obtain the network address, such as the IP address, of the host. The management server 108 addresses messages to a device using the telephone number or other unique identifier of the device 102.

The device 102 may be registered with the management server 108, or may be registered with a database 204. The registration may associate the telephone or MSISDN number of the device 102 with the network address of the device 102, or may associate some other unique identifier of the device 102 with the network address of the device. If the network address or IP address or SIP caller-id or SIP address of the device 102 is explicitly associated with the device's 102 telephone number or unique identifier at the management server 108 or the management server 108 contacts a database 204 (e.g., enum database, SIP server), the management server will obtain the network address or IP address or SIP caller-id or SIP address of the device 102 using the telephone number or other unique identifier of the device 102.

The unique identifier, which may be referred to as the device identity, can be a unique immutable string that is associated with the device 102 hardware. This may be assigned to a device 102 by the manufacturer and as such contains information about the device 102. Examples of such a unique identifier or device identity include device serial number, Electronic Serial Number (ESN), Mobile Equipment Identifier (MEID), (International Mobile Equipment Identity) IMEI, or Stock Keeping Unit (SKU). This device identity generally is associated with a hardware component of the device 102 and uniquely identifies the device 102.

To initiate a communication with a wireless device 102, the management server 108 notifies the device 102 of an incoming communication by sending a SIP invite message 206 with a message header in which the destination address is the network address or IP address or SIP caller-id or SIP address of the wireless device 102 obtained by the management server as described above. The management server 108 may address the header of the invite message 206 with information additional to the network address, for example to a particular port of the wireless device 102, or for example to a particular port that is assigned to or listened to by management client 202 on device 102. The message header also contains information about the management server 108 such as the server's 108 URL or network address and may also contain the necessary security credentials to initiate a data session between the device 102 and the management server 108. All the data that is embedded in the SIP invite message that is received by the management client 202 on the device 102 is termed the notification message.

Figure 3:
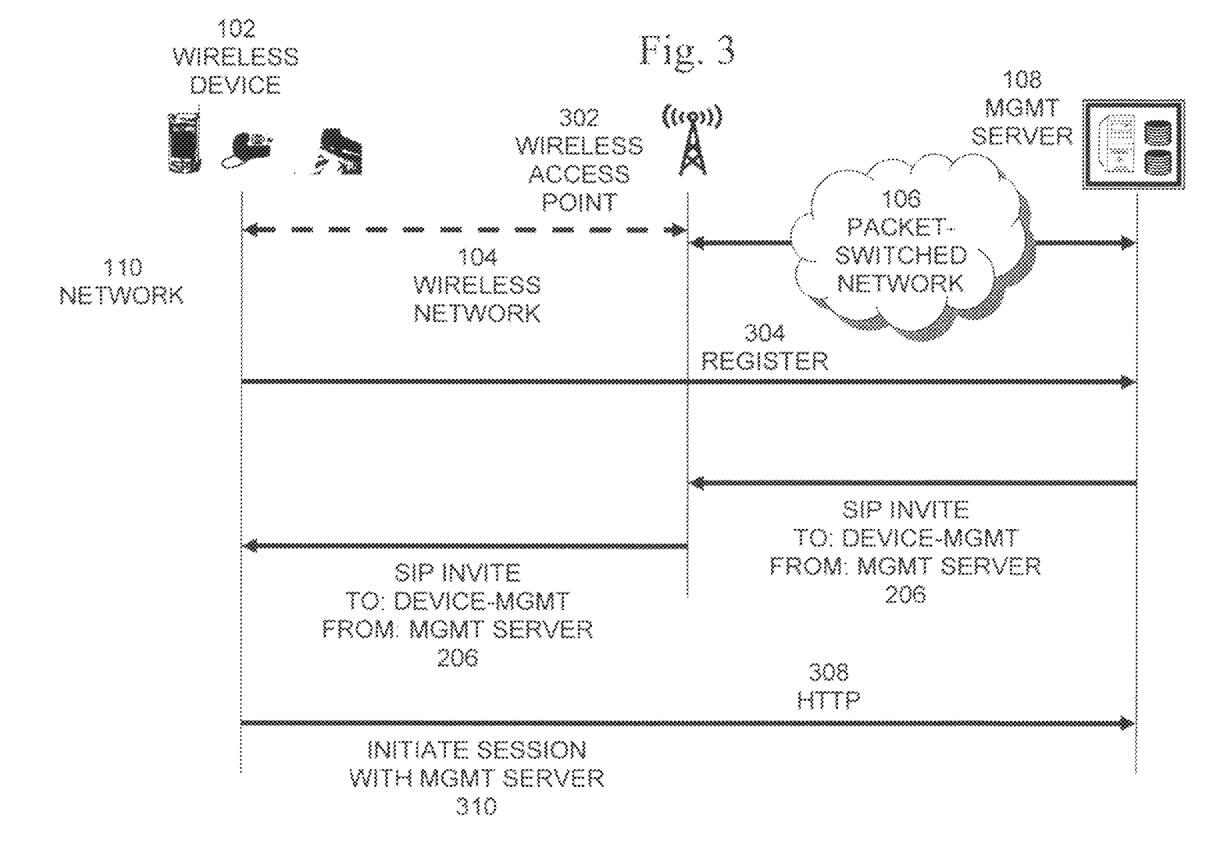
FIG. 3 is an exemplary flow diagram of a process where a wireless device registers with a management server.

In one aspect of the invention, a wireless device 102 active on the network 110 (network 110 is described more fully with reference to FIG. 1) can announce its presence on the network 110 to the management server by registering its network address directly with the management server 108 as shown in FIG. 3. In the example demonstrated in FIG. 3, the wireless network 104 consists of one or more wireless access points 302 acting as a gateway between the fixed network 106 and the wireless devices 102. The device 102 can use any of the available transport mechanisms exemplified by protocols such as SMS, TCP/IP, UDP/IP, SIP REGISTER, https, http to register 304 with the management server 108. The device 102 may have the address and credentials for the management server 108 because it has previously registered with the management server 108, or it may have "bootstrap information".

In order to connect to the management server 108, the device 102 needs information about how to contact the management server 108. A device 102 that is provisioned with the necessary information to connect to a management server 108 is called a "bootstrapped device". Bootstrap information—such as the address of the management server 108, the necessary credentials to communicate with the server 108, etc.—is sufficient for the device 102 to register or to establish a management session. This information may, for example, be pre-loaded onto the device 102, or alternatively the information may be sent to the device 102 by the management server 108 in the header of an SIP invite message 206 such as a notification message, or in another alternative the bootstrap information may be sent separately within an SIP message sent for the purpose of programming the device 102 with the necessary bootstrap information for the management server 108, or in another alternative the information may be sent in the header of an SIP message sent to device 102 for any other purpose.

To initiate a management session with the wireless device 102, according to the example in FIG. 3 the management server 108 embeds a notification message in the SIP invite message 206 and sends it to the wireless device 102. On receipt and parsing of the SIP invite message the management client 202 on device 102 initiates a data session 310 with the management server 108.

The management session 310 with the server is typically carried over a standard protocol such as http 308. However, the session can be carried over any suitable transport available and practical for the device, for example, FTP. Further, a management session 310 could involve multiple interactions between the device and the server.

Figure 4:
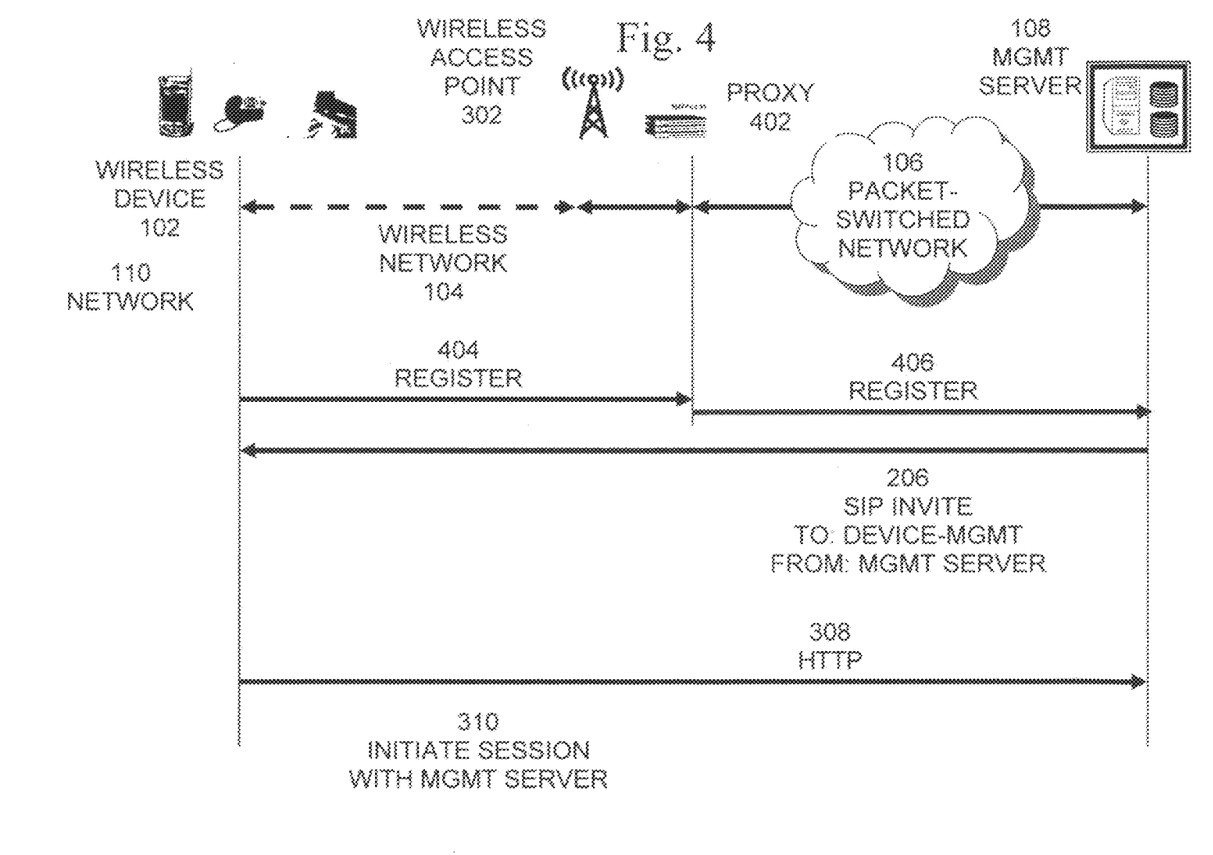
FIG. 4 is an exemplary flow diagram of a process where a wireless device registers with a proxy device and a notification message is sent to the wireless device.

In another embodiment of the invention, if the wireless device 102 is not be able to directly register with the management sever 108, the device 102 can register 404 with a local proxy device 402 as shown in FIG. 4. The proxy device 402 is connected to the network 110 and supports any of the wireless interfaces necessary to communicate with the wireless device 102. Examples of such proxy devices 402 include but are not limited to set top boxes, cable modem routers, DSL routers, or a customer premises equipment (CPE) device. The proxy device 402 in turn registers 406 the wireless device 102 with the management server 108.

The registered device 102 is capable of receiving SIP messages, for example directly from the management server 108 or alternatively is capable of receiving SIP messages only from the proxy device 402. The registration information sent by the wireless device 102 or by the proxy device 402 in steps 304 or 404 may indicate whether the device 102 is capable of receiving messages directly from the management server, for example the registration information may include a tag classifying the wireless device as direct or indirect. The management server108 may structure the header of a SIP invite notification message based on the tag sent by the wireless device 102 or proxy 402. For example, if the tag indicates a direct device, the SIP invite message is sent from the management server 108 directly to the wireless device 102 as shown in FIG. 4. Alternatively, if the address of the wireless device 102 contained in the registration message is a publicly routable address, then the management server 108 may directly send the SIP invite message 206 to the wireless device 102 as shown in FIG. 4.

FIG. 4 shows an example of the mechanism by which the proxy device 402 relays a registration message to the management server 108. The wireless device 102 relays a registration message in step 404 to the proxy device 402 via wireless network 104. The registration message contains the address of the device 102. The proxy device 402 relays the registration information to management server 108 via network 106 in step 406. As shown in FIG. 4, if the address of the wireless device 102 contained in the registration message is a publicly routable address, then the management server 108 directly sends the SIP invite message 206 to the wireless device 102. Wireless device 102 initiates a management session with management server 108 in step 308, for example, using HTTP protocol.

Figure 5:
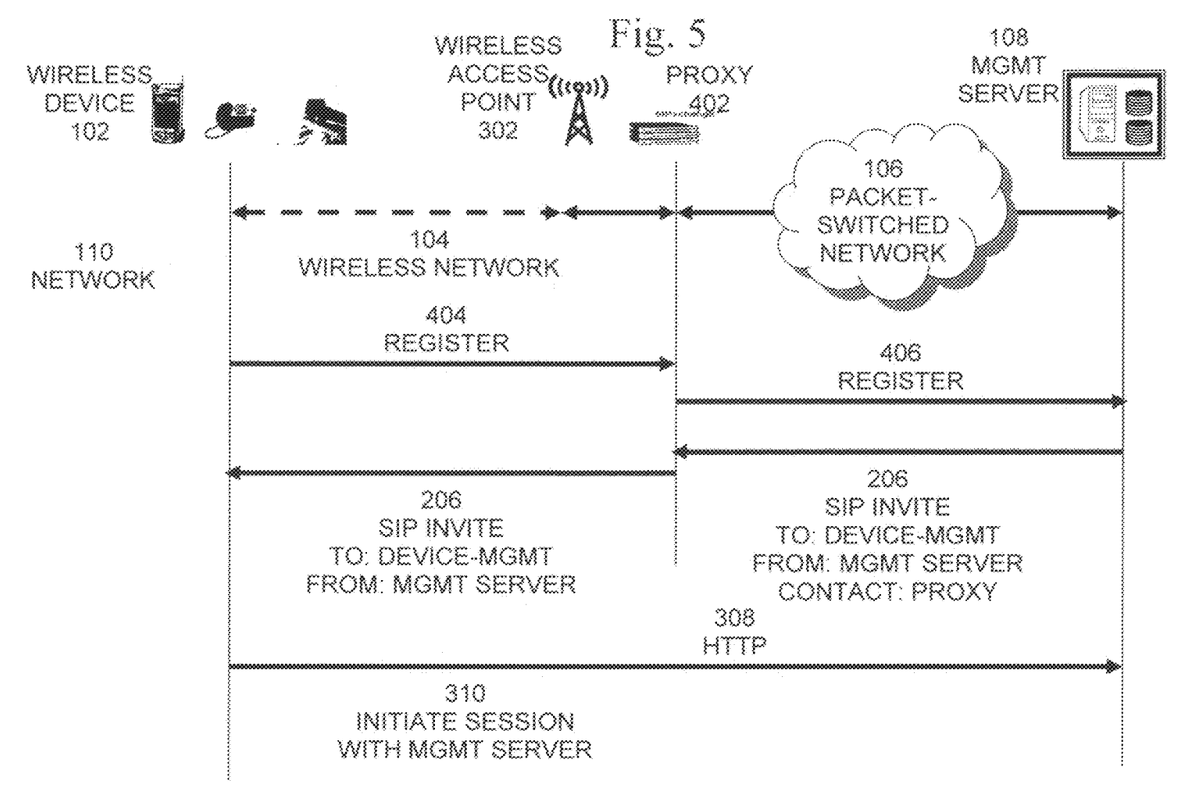
FIG. 5 is an exemplary flow diagram of a process where a wireless device registers with a proxy device and a notification message is sent indirectly to the wireless device via the proxy device.

However, as shown, for example, in FIG. 5, if the address of the wireless device 102 is a private address then the SIP invite message 206 is sent to the proxy device 402 with the device identifier or private address of the wireless device 102 contained in the invite message in step 206, and the proxy device 402 in turn relays the SIP invite message 206 to the wireless device 102 at the private address of the wireless device 102. For example, the management server 108 sends a notification message 206 to the wireless device 102 by embedding the private address of the wireless device 102 within the SIP message sent to the proxy device 402. On receipt of the SIP invite message 206, the proxy device 402 strips the outer header and relays the SIP message 206 to the wireless device 102. The wireless device 102 then initiates a management session 310 with the management server 108 via network 110.

In another embodiment of this invention, the wireless device 102 or the proxy device 402 can reregister with the management server 108 whenever the network address of the wireless device 102 changes. The network address assigned to a device 102 can change for various reasons, for example when the device 102 moves to a different network 104, or attaches to a different proxy device 402, or the lease on the assigned network address expires. The management server 108 needs to know the current network address of the device 102 to which the notification is sent. When the device 102 is reregistered with the management server 108, the destination address of any SIP invite message 206 is updated. The re-registration may involve, for example, any of the steps as explained in the method for registration above, or alternatively, may involve greater or fewer steps.

Figure 6:
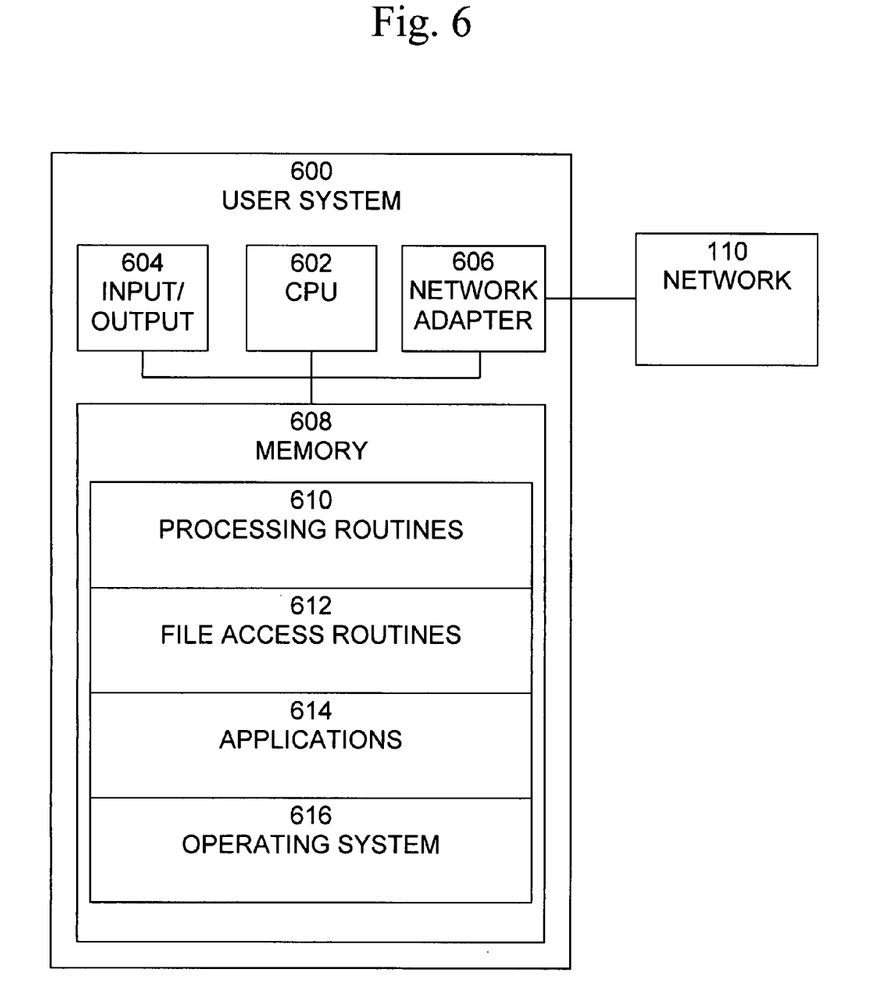
FIG. 6 is a diagram of an exemplary block diagram of a system on which the present invention may be implemented.

A block diagram of an exemplary user system 600, in which the management server 108 of the present invention may be implemented, is shown in FIG. 6. User system 600 is typically a programmed general-purpose computer system, such as a personal computer, workstation, server system, and minicomputer or mainframe computer. User system 600 includes processor (CPU) 602, input/output circuitry 604, network adapter 606, and memory 608. CPU 602 executes program instructions in order to carry out the functions of the present invention. Typically, CPU 602 is a microprocessor, such as an INTEL PENTIUM® processor, but may also be a minicomputer or mainframe computer processor. Although in the example shown in FIG. 6, user system 600 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which user system 600 is implemented on a plurality of networked computer systems, which may be single-processor computer systems, multi-processor computer systems, or a mix thereof.

Input/output circuitry 604 provides the capability to input data to, or output data from, user system 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces user system 600 with Internet/intranet 610. Internet/intranet 610 may include one or more standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the functions of user system 600. Memory 608 typically includes electronic memory devices, such as random-access memory (RAM), which are capable of high-speed read and write operations providing direct access by the CPU 602. Additional memory devices included in user system 600 may include read-only memory (ROM), programmable read-only memory (PROM), electrically erasable programmable read-only memory (EEPROM), flash memory, electro-mechanical memory, magnetic disk drives, hard disk drives, floppy disk drives, tape drives, optical disk drives, etc.

Memory 608 includes processing routines 610, file access routines 612, applications 614, and operating system 616. File access routines 614 include software that provides access to files stored on local file storage and remote storage. Applications 614 include software used to perform other functions on user system 600. Operating system 616 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for establishing a device management session between a wireless device and a device management server over a wireless network, the wireless device and a proxy device operable to receive and parse Session Initiation Protocol messages, the wireless network operable to transmit messages between the wireless device and the proxy device and the proxy device and the device management server, the method comprising:

registering the wireless device with the proxy device, where in response thereto, the proxy device sends a registration message to the device management server, the registration message including a network address of the wireless device, wherein a device identity and the network address of the wireless device are registered with at least one of the proxy device and the device management server, the device identity being a unique immutable identity associated with the wireless device;

generating a notification message embedded inside a Session Initiation Protocol invite message including the network address of the wireless device, the Session Initiation Protocol invite message providing an indication to establish the device management session between the device management server and the wireless device;

sending the Session Initiation Protocol invite message from the device management server to the proxy device;

sending the Session Initiation Protocol invite message from the proxy device to the wireless device at the network address of the wireless device;

receiving the Session Initiation Protocol invite message on the wireless device; and parsing the Session Initiation Protocol invite message on the wireless device.

2. The method of claim 1, where the device identity of the wireless device is encapsulated within the Session Initiation Protocol invite message sent to the proxy device.

3. The method of claim 1, where the notification message embedded in the Session Initiation Protocol invite message contains bootstrap information for the device to connect to the device management server.

4. The method of claim 3, where the bootstrap information contained in the Session Initiation Protocol invite message includes server credentials and a server address to which to connect to the device management server.

5. The method of claim 1, wherein the Session Initiation Protocol invite message is received on a specific Session Initiation Protocol port on the wireless device.

6. The method of claim 1, further comprising registering a network address of the proxy device with the device management server.

7. The method of claim 1, where the proxy device registers the network address of the wireless device with the device management server.

8. The method of claim 1, where a link local address of the wireless device is encapsulated within the Session Initiation Protocol invite message sent to the proxy device.

9. The method of claim 1, where the proxy device is listening on a special port for notification messages sent as Session Initiation Protocol invite messages.

10. The method of claim 1, where the proxy device registers its network address with the device management server.

11. The method of claim 1, where the wireless device registers its device identity and link local address with the proxy device.

12. The method of claim 1, where the proxy device registers a link local address of the wireless device with the device management server.

13. The method of claim 1, further comprising re-registering the proxy device with the device management server if a network address of the proxy device changes.

14. The method of claim 1, further comprising:
- detecting a change of the network address of the wireless device;
- re-registering the wireless device with the proxy device; and
- sending the re-registration of the wireless device to the device management server from the proxy device.

15. The method of claim 1, where the proxy device on a change in the network address of the registered wireless device, re-registers the network address of the wireless device with the device management server.

16. The method of claim 1, further comprising establishing the device management session between the wireless device and the device management server.

17. The method of claim 1, further comprising determining the network address of the wireless device from a device identity.

18. The method of claim 17, wherein determining the network address of the wireless device comprises:
- sending the device identity to a database using a Session Initiation Protocol message; and
- receiving the network address of the device from the database using a Session Initiation Protocol message.

19. The method of claim 1, further comprising re-registering the wireless device with the device management server if the network address of the wireless device changes.

20. The method of claim 1, wherein registering the wireless device includes indicating that the wireless device is an indirect device.

21. A method for establishing a device management session between a wireless device and a device management server over a wireless network, the wireless device and a proxy device operable to receive and parse Session Initiation Protocol messages, the wireless network operable to transmit messages between the wireless device and the proxy device and the proxy device and the device management server, the method comprising:
- registering the wireless device with the proxy device, where in response thereto, the proxy device sends a registration message to the device management server, the registration message including a network address and a device identity of the wireless device, wherein a device identity and the network address of the wireless device are registered with at least one of the proxy device and the device management server, the device identity being a unique immutable identity associated with the wireless device;
- generating a notification message embedded inside a Session Initiation Protocol invite message including the network address of the wireless device, the Session Initiation Protocol invite message providing an indication to establish the device management session between the device management server and the wireless device;
- sending the Session Initiation Protocol invite message from the device management server to the wireless device at the network address of the wireless device;
- receiving the Session Initiation Protocol invite message on the wireless device; and
- parsing the Session Initiation Protocol invite message on the wireless device.

22. The method of claim 21, wherein registering the wireless device includes indicating that the wireless device is a direct device.

23. The method of claim 21, further comprising establishing the device management session between the wireless device and the device management server.

* * * * *